US 12,304,425 B2

(12) United States Patent
Feyerabend et al.

(10) Patent No.: US 12,304,425 B2
(45) Date of Patent: May 20, 2025

(54) METHOD AND SYSTEM FOR TRIGGERING A FUNCTION IN A VEHICLE

(71) Applicant: ZF CV Systems Global GmbH, Bern (CH)

(72) Inventors: Konrad Feyerabend, Hannover (DE); Philip Meyer-Rössler, Giesen (DE); Florian Rehm, Wennigsen (DE)

(73) Assignee: ZF CV Systems Global GmbH, Bern (CH)

( * ) Notice: Subject to any disclaimer, the term of this patent is extended or adjusted under 35 U.S.C. 154(b) by 393 days.

(21) Appl. No.: 17/751,241

(22) Filed: May 23, 2022

(65) Prior Publication Data

US 2022/0274560 A1 Sep. 1, 2022

Related U.S. Application Data

(63) Continuation of application No. PCT/EP2020/081468, filed on Nov. 9, 2020.

(30) Foreign Application Priority Data

Nov. 29, 2019 (DE) .................. 10 2019 132 542.0

(51) Int. Cl.
*B60R 25/24* (2013.01)
*B60R 25/23* (2013.01)

(52) U.S. Cl.
CPC .............. *B60R 25/24* (2013.01); *B60R 25/23* (2013.01); *B60R 2325/101* (2013.01);
(Continued)

(58) Field of Classification Search
CPC ... B60R 25/24; B60R 25/23; B60R 2325/101; B60R 2325/103; B60R 2325/106; B60R 2325/205
See application file for complete search history.

(56) References Cited

U.S. PATENT DOCUMENTS 8,912,924 B2 * 12/2014 Scofield ................. G07B 15/04
340/988
9,120,452 B2 * 9/2015 Nishimoto ............. B60R 25/24
(Continued)

FOREIGN PATENT DOCUMENTS

CN 107187421 A 9/2017
CN 110049903 A 7/2019
(Continued)

OTHER PUBLICATIONS

DE102015203661 (Year: 2016).*
(Continued)

*Primary Examiner* — Thomas D Alunkal
(74) *Attorney, Agent, or Firm* — Walter Ottesen, P.A.

(57) ABSTRACT

A method is for activating a vehicle function, wherein a controller for activating the vehicle function checks an access authorization of the mobile device and activates the vehicle function only if the authorization is acceptable. The method includes: a) the controller sending a request to the mobile device demanding transmission of the authorization for a vehicle function, b) the mobile device receiving the request from the controller and sending the authorization to the controller, c) the controller checking the authorization and activates the vehicle function if the authorization is acceptable, d) the mobile device sending the authorization only if the device was previously actuated for the purpose of authorization and thus was authorized to send the authorization, e) and the controller activating the vehicle function only if a signal of a sensor device actuatable by the user has previously been received by the controller.

34 Claims, 4 Drawing Sheets

(52) U.S. Cl.
CPC ... *B60R 2325/103* (2013.01); *B60R 2325/106* (2013.01); *B60R 2325/205* (2013.01)

(56) References Cited

U.S. PATENT DOCUMENTS

| | | | | |
|---|---|---|---|---|
| 9,510,159 | B1* | 11/2016 | Cuddihy | H04W 4/046 |
| 11,524,656 | B2* | 12/2022 | Yorke | B60R 25/24 |
| 2014/0303811 | A1* | 10/2014 | Ledendecker | B60R 25/24 |
| | | | | 701/2 |
| 2016/0039365 | A1* | 2/2016 | Vanderwall | B60C 23/0418 |
| | | | | 701/36 |
| 2016/0337815 | A1* | 11/2016 | Cuddihy | H04W 4/029 |
| 2016/0337816 | A1* | 11/2016 | Elzein | H04W 40/02 |
| 2017/0267213 | A1* | 9/2017 | Berezin | B60K 35/80 |
| 2018/0096540 | A1* | 4/2018 | Katou | G07C 9/00309 |
| 2018/0194321 | A1* | 7/2018 | Zank | G07C 9/00182 |
| 2020/0094777 | A1* | 3/2020 | Heinrich | B60R 25/04 |
| 2020/0258330 | A1* | 8/2020 | Gorski | E05B 81/78 |
| 2020/0351665 | A1* | 11/2020 | Kelly | H04W 12/069 |

FOREIGN PATENT DOCUMENTS

| | | |
|---|---|---|
| DE | 10 2011 013 605 A1 | 9/2012 |
| DE | 10 2011 083 820 A1 | 4/2013 |
| DE | 10 2011 116 157 A1 | 4/2013 |
| DE | 10 2015 203 661 A1 | 9/2016 |
| DE | 10 2016 015 273 A1 | 6/2017 |
| DE | 11 2016 000 824 T5 | 11/2017 |
| DE | 10 2017 200 380 A1 | 7/2018 |
| DE | 10 2017 103 233 A1 | 8/2018 |
| DE | 10 2017 202 086 A1 | 8/2018 |
| WO | 2012/017214 A1 | 2/2012 |
| WO | 2019/095023 A1 | 5/2019 |

OTHER PUBLICATIONS

WO2017/157541 (Year: 2017).*
International Search Report of the European Patent Office dated Jan. 29, 2021 for international application PCT/EP2020/081468 on which this application is based.
Translation and Written Opinion of the International Searching Authority dated Jan. 29, 2021 for international application PCT/EP2020/081468 on which this application is based.

* cited by examiner

METHOD AND SYSTEM FOR TRIGGERING A FUNCTION IN A VEHICLE

CROSS REFERENCE TO RELATED APPLICATIONS

This application is a continuation application of international patent application PCT/EP2020/081468, filed Nov. 9, 2020 designating the United States and claiming priority from German application 10 2019 132 542.0, filed Nov. 29, 2019, and the entire content of both applications is incorporated herein by reference.

TECHNICAL FIELD

The present disclosure relates to a method for triggering a vehicle function, using a wireless connection between a mobile device that is actuatable by a user and an electronic controller provided for triggering the function, wherein the controller checks an access permission of the mobile device and triggers the vehicle function only if the access permission is in order. In addition, the disclosure relates to a system for triggering a vehicle function. The disclosure also relates to a control unit for carrying out the method and/or for use in the system.

BACKGROUND

The opening of locks on vehicle doors via a radio remote control is known. A user actuates the remote control. The remote control transmits a signal to an electronic controller in the vehicle. The controller checks whether the code of the remote control code that is contained in the signal matches the vehicle, that is, is in order, and if needed initiates release of the locks provided for this purpose on the vehicle. The doors secured by the locks can now be opened by simple mechanical actuation.

So-called keyless-entry systems or keyless-go systems are also known. The systems allow the user to access the vehicle without manually actuating the remote control. The remote control independently transmits a low-power signal to the controller periodically. The controller constantly "listens" for signals from the remote control. If the distance between the remote control and the controller is only a few meters or less, the controller recognizes the signal from the remote control and releases the locks. Generally, the user then only has to actuate a door handle or come into the detection range of a sensor, for example with a foot movement to open a trunk lid, in order for the door in question to open. One disadvantage of these systems is that, although handling is simplified for the user, the remote control signals can be intercepted by third parties, amplified, and transmitted over longer distances to the controller in the vehicle. In this way, unauthorized persons can unlock the vehicle in the absence of the user and without the user's knowledge.

DE 10 2011 083 820 A1 discloses a method for granting access to a vehicle. A primary user transmits a special usage code via a smartphone to a smartphone of a secondary user. The secondary user uses a smartphone to transmit the usage code to a control device of a motor vehicle, for example via the mobile radio network or via Bluetooth. The access mode granted to the secondary user in this way may be displayed on the smartphone display. The usage code may be encrypted, comprise an authentication code, and/or be provided with an electronic signature. The control device of the motor vehicle may store a plurality of access codes. The control device compares received user codes with the stored access codes. If there is a match, the secondary user may be granted access to the motor vehicle. "Access" may include unlocking locking devices or enabling an engine starting device. Time and place may also be provided as secondary conditions.

In addition to opening locks, the triggering of other vehicle functions may be of interest, such as the actuation of special attachments (crane, lifting platform) or lowering and raising the vehicle via pneumatic suspension.

SUMMARY

It is an object of the disclosure to provide a method and a system via which it is to be possible for a user to trigger vehicle functions as safely and simply as possible.

The vehicle function is preferably a function of a commercial vehicle. The aforementioned object can, for example, be achieved via a method including the steps:
  a) the controller prompts the mobile device via a request to transmit the access permission for a vehicle function,
  b) the mobile device receives the request of the controller and transmits the access permission to the controller,
  c) the controller checks the access permission and triggers the vehicle function if the access permission is in order,
  d) wherein the mobile device transmits the access permission to the controller only if the mobile device has previously been actuated for authorization and has thus been authorized to transmit the access permission,
  e) and wherein the controller triggers the vehicle function only if a signal of a sensor device that is actuatable by the user has previously been received in the controller.

An electronic controller and a mobile device communicate wirelessly with one another. The controller prompts the mobile device to transmit the access permission. The mobile device then transmits the access permission to the controller. Preferably, the mobile device and the controller have previously paired to perform the communication, so that the communication is limited to the mobile device and the controller.

The controller checks the received access permission. If the access permission is in order, the vehicle function is enabled for the user or carried out immediately.

The access permission is in order if the check of the access permission by the controller is positive, that is, if there is a match with data and/or criteria stored in the controller.

Finally, before transmitting the access permission to the controller, the mobile device is to be authorized. For this purpose, a user is to actuate the mobile device at least once. The actuation by the user does not have to take place immediately before transmitting the access permission to the controller. There may be other intermediate method steps. However, the user must actuate two different devices, namely the mobile device and the sensor device, at a time interval. This results in a double level of security. Preferably, the sensor device is arranged on the vehicle and is not connected wirelessly to the controller, that is, it is wired to the controller. As a result, it is possible to prevent concealed opening of the vehicle from a distance. However, the sensor device may also be wirelessly connected to the controller.

By actuating the sensor device, the user makes a request to the controller to open. In the simplest case, the sensor device is a button or pushbutton which is provided on the outside of the vehicle and which is connected to the controller via a line. However, the sensor device may also be a device of a different type via which an action of the user is identified or detected, and a corresponding signal is transmitted to the controller.

It is possible that a specified, predefined sequence of steps of the method is established and monitored. According to a further aspect of the disclosure, it may therefore be provided that the user actuates the sensor device for transmitting the signal to the controller a) after authorization of the mobile device and before the controller prompts the mobile device to transmit the access permission, or
b) after transmitting the access permission from the mobile device to the controller, or
c) before the user actuates the mobile device for authorization and before the controller prompts the mobile device to transmit the access permission.

Security may be further increased by defining and monitoring a specified, predefined sequence of steps. If the sequence is not followed, the process is terminated by the control unit or by the mobile device, preferably by the control unit.

According to another aspect of the disclosure, it may be provided that the mobile device must be actuated for authorization of the transmission of the access permission, before the controller prompts the mobile device to transmit the access permission. Preferably, the user must enable the transmission of the access permission on the mobile device or release it in another manner by entering the appropriate data. If this is not done, there is no authorization in the mobile device, and the prompt of the controller to transmit the access permission is ignored by the mobile device. This also increases security.

According to a further aspect of the disclosure, it may be provided that the mobile device transmits the access permission only if a specified time period between the actuation of the mobile device for authorization on the one hand, and the request of the controller to transmit the access permission on the other hand, is not exceeded. The time period for this may be stored or saved in the mobile device, for example as a time window defined by a number of seconds. The user authorizes the mobile device. This starts a time measurement in the mobile device. In the further course, the electronic controller prompts the transmission of the access permission. The mobile device then first checks whether the predetermined time has expired. If the time has not yet expired, the mobile device transmits the access permission to the controller.

According to another aspect of the disclosure, the specified time period may be stored in the mobile device permanently or temporarily. In the case of temporary storage, the specified time period may be overwritten and/or deleted, for example via input to the device or by transmitting data to the device. It is particularly easy to save the specified time period permanently in the mobile device.

Alternatively, the specified time period may be stored in the control unit. The mobile device then transmits the access permission without checking the time period, but records the time period between the actuation of the mobile device for authorization on the one hand, and the request of the controller to transmit the access permission on the other hand, and transmits this recorded time period to the controller. The controller compares the recorded time period with the specified time period and may terminate the process if the specified process is exceeded. The time period may also be recorded and transmitted in the form of instants for the beginning and end of the time period.

According to another aspect of the disclosure, it may be provided that the mobile device must be actuated for authorization of the transmission of the access permission, after the controller has prompted the mobile device to transmit the access permission for the vehicle function, and before the mobile device transmits the access permission to the controller. Authorization is possible only at a specified stage of the method. This further increases security.

According to another aspect of the disclosure, it may be provided that the mobile device prompts the user for authorization by means a signal that is perceptible by the user. The signal is preferably of a visual, acoustic, or haptic nature. For example, the device may sound a tone, voice, or melody, a light on the device may illuminate, a display on the device may indicate a prompt, and/or an unbalance motor in the device may generate a vibration.

According to another aspect of the disclosure, it may be provided that the mobile device includes a keypad, a screen, and/or a touch-sensitive panel, and that the mobile device is actuated by the user via a sensor without reading or touching the keypad, screen, and/or panel. The aim is to avoid user interaction with the mobile device in which the user deliberately selects specific areas of the device and interacts with these areas, for example via a keypad or a screen area. Rather, the user is preferably to be able to actuate the device without viewing it, for example by shaking or tapping it. This is also possible if the mobile device is in the user's trouser pocket or jacket pocket and has for example previously emitted a sound as a prompt for actuation.

According to another aspect of the disclosure, it may be provided that the mobile device includes an acceleration sensor and interprets a specified acceleration as an actuation. The acceleration sensor can be used to detect movements of the device, for example by tapping or shaking or in other ways. The acceleration sensor measures the acceleration. If a stored acceleration limit value is exceeded and/or if a specified acceleration pattern is present, it is assumed that the user has performed an actuation.

According to another aspect of the disclosure, the mobile device may be connected to an external input device wirelessly or in a wired manner, and the user may actuate the external input device for authorization. For example, a remote control or microphone may be connected to the mobile device, thus making a simplified input for authorization possible for the user.

According to another aspect of the disclosure, the sensor device may include one or several mechanical switches, tactile elements, or sensors. The sensor device is preferably a simple pushbutton. However, other mechanical switches or a touch-sensitive surface may also be provided as a tactile element. Special sensors such as optical or acoustic sensors are also possible. Also possible are a camera acting as an optical sensor, in connection with image processing and/or face recognition, and a microphone with or without text recognition. The user may thus activate the sensor device by placing his/her face in front of the camera. The sensor device may also include a keypad, for example for entering a code made up of numbers and/or letters. To actuate the sensor device, the user is to be active, in particular by gripping, pressing, moving, or pointing.

According to another aspect of the disclosure, the mobile device may be a cell phone or a remote control. Preferably, the mobile device is a smartphone having an app, wherein the app is programmed for handling the access permission. The further aforementioned specified period for transmitting the access permission may also be stored in the app.

According to another aspect of the disclosure, the wireless connection between the mobile device and the controller may be carried out via Bluetooth, Bluetooth Low Energy, WLAN, or NFC (Near-Field Communication). In particular, the wireless connection may be carried out via so-called near-field communication technology, in which the transmitter and receiver are to be only a few meters apart.

According to another aspect of the disclosure, the mobile device may be radio network-capable and may receive access permissions via a radio network. Simple radio remote controls for vehicles are tuned to exactly one vehicle and can only open the vehicle. By transmitting access permissions via a radio network, the mobile device may be adapted to different vehicles. The user may use the mobile device as a universal remote control for all vehicles. Only the access permissions on the mobile device are exchanged. If the mobile device is connected to the radio network, that is, a network connection exists, a new access permission may be received. Preferably, the radio network is a mobile radio network.

According to another aspect of the disclosure, the vehicle function may include actuating a lock. Preferably, this is the opening of the lock in the sense of a release or mechanical unlocking. However, locking or closing of the lock may also be the result of the actuation.

The vehicle function to be triggered may also be of a different type. For example, the function may include the actuation of special attachments (crane, lifting platform) or lowering and raising the vehicle via pneumatic suspension or other actions on the vehicle.

A system according to the disclosure includes:
a) an electronic controller is configured to prompt the mobile device via a request to transmit the access permission for the vehicle function,
b) the mobile device is configured to receive the request of the controller and to transmit the access permission,
c) the controller is configured to check the access permission transmitted by the mobile device and to trigger the vehicle function if the access permission is in order,
d) the mobile device is configured to transmit the access permission to the controller if the mobile device has previously been actuated for authorization and has thus been authorized to transmit the access permission,
e) a sensor device that is actuatable by the user is connected to the electronic controller and is configured to transmit a signal to the electronic controller.

A system according to the disclosure can preferably be configured for carrying out a method according to the disclosure and may include all components required for this purpose.

It is possible that a specified, predefined sequence of steps for triggering the vehicle function is defined and monitored. According to a further aspect of the disclosure, it may therefore be provided that the user must actuate the sensor device for transmitting the signal to the controller
a) after authorization of the mobile device and before the controller prompts the mobile device to transmit the access permission, or
b) after transmitting the access permission from the mobile device to the controller, or
c) before authorizing the mobile device and before the controller prompts the mobile device to transmit the access permission.

Security may be further increased by defining and monitoring a specified, predefined sequence of steps. If the sequence is not observed, the process is terminated by the control unit or the mobile device.

According to a further aspect of the disclosure, it may be provided that the mobile device must be actuated for authorization of the transmission of the access permission, before the sensor device transmits a signal to the controller. When the signal from the sensor device is received, the controller checks whether the access permission has already been transmitted. If this is not the case, the signal from the sensor device is ignored. The opening process is then terminated.

According to a further aspect of the disclosure, it may be provided that the mobile device transmits the access permission only if a specified time period between the actuation of the mobile device for authorization on the one hand, and the request of the controller to transmit the access permission on the other hand, is not exceeded. By limiting to one time period, security is further increased. The specified time period is preferably less than half a minute.

Advantageously, the specified time period is stored in the mobile device permanently or temporarily.

Alternatively, the specified time period may be stored in the control unit. The mobile device then transmits the access permission without checking the time period, but records the time period between the actuation of the mobile device for authorization on the one hand, and the request of the controller to transmit the access permission on the other hand, and transmits this recorded time period to the controller. The controller compares the recorded time period with the specified time period and may terminate the process if the specified process is exceeded. The time period may also be recorded and transmitted in the form of instants for the beginning and end of the time period.

According to another aspect of the disclosure, it may be provided that the mobile device must be actuated for authorization of the transmission of the access permission, after the controller has prompted the mobile device to transmit the access permission, and before the mobile device transmits the access permission to the controller. Without authorization, the mobile device does not transmit access permission. Alternatively, the authorization is a separate piece of information that is to be sent to the controller together with the access permission. If no authorization has taken place, the access permission is transmitted without positive authorization information. The controller checks the received information, determines that the positive authorization information is missing, and terminates the process.

According to another aspect of the disclosure, the mobile device may output a signal that is perceptible by a user. The signal is preferably an acoustic, optical, or haptic signal. A signal that can be perceived by the user without having to look directly at the mobile device and/or hold it in the hand is particularly preferred.

According to another aspect of the disclosure, the mobile device may include a keypad, a screen, and/or a touch-sensitive panel, wherein the mobile device is actuatable by the user via a sensor without reading and/or touching the keypad, screen, or panel. Preferably, the sensor is a sensor via which movements of the mobile device are detectable.

According to another aspect of the disclosure, the mobile device may include an accelerometer, and may interpret a specified acceleration as an actuation, for example a shake or tap.

According to another aspect of the disclosure, the mobile device may be connected to an external input device wirelessly or in a wired manner, wherein the input device is actuatable by a user. In this case, the external input device has the purpose of a remote control in connection with a simple input action. Preferably, it is a switch, a mechanical sensor, an optical sensor, or an acoustic sensor. Also possible are a microphone in connection with text recognition, and/or a camera in connection with motion detection or face recognition.

According to another aspect of the disclosure, the sensor device may include one or several sensors, tactile elements, or mechanical switches for actuation by a user. In particular, the sensor device may be configured just as differently as the aforementioned external input device.

According to another aspect of the disclosure, the mobile device may be a cell phone or a remote control. Advantageously, the mobile device is a smartphone having an app, wherein the app is programmed for handling the access permission.

According to another aspect of the disclosure, it is provided that the wireless connection is implementable via Bluetooth, Bluetooth Low Energy, WLAN, or NFC. The mobile device and the controller are to be equipped accordingly.

According to another aspect of the disclosure, the mobile device may be radio network-capable and receive access permissions over a radio network. In this way, access permissions intended for the user may be transmitted to the mobile device, for example for a specified vehicle lock. If the mobile device is connected to the radio network, that is, a network connection exists, a new access permission may be received. Preferably, the radio network is a mobile radio network.

According to another aspect of the disclosure, the system includes a vehicle lock that is connected to the electronic controller, wherein the vehicle function to be triggered is the actuation of the lock. Here, "actuation" means an influencing of a lock, a closing and/or in particular an opening of the lock.

A further object of the disclosure is a control unit. The control unit is configured for carrying out the method and/or for use in the system, and is provided with an interface for connection to the sensor device. In addition, the control unit includes an interface for wireless connection to the mobile device, and an interface for triggering a vehicle function. For this purpose, the control unit is equipped with corresponding software. The vehicle function is in particular the opening or closing of a lock. The control unit may be integrated with the lock in one unit or provided separately.

BRIEF DESCRIPTION OF THE DRAWINGS

The invention will now be described with reference to the drawings wherein.

DESCRIPTION OF THE PREFERRED EMBODIMENTS

Figure 1:
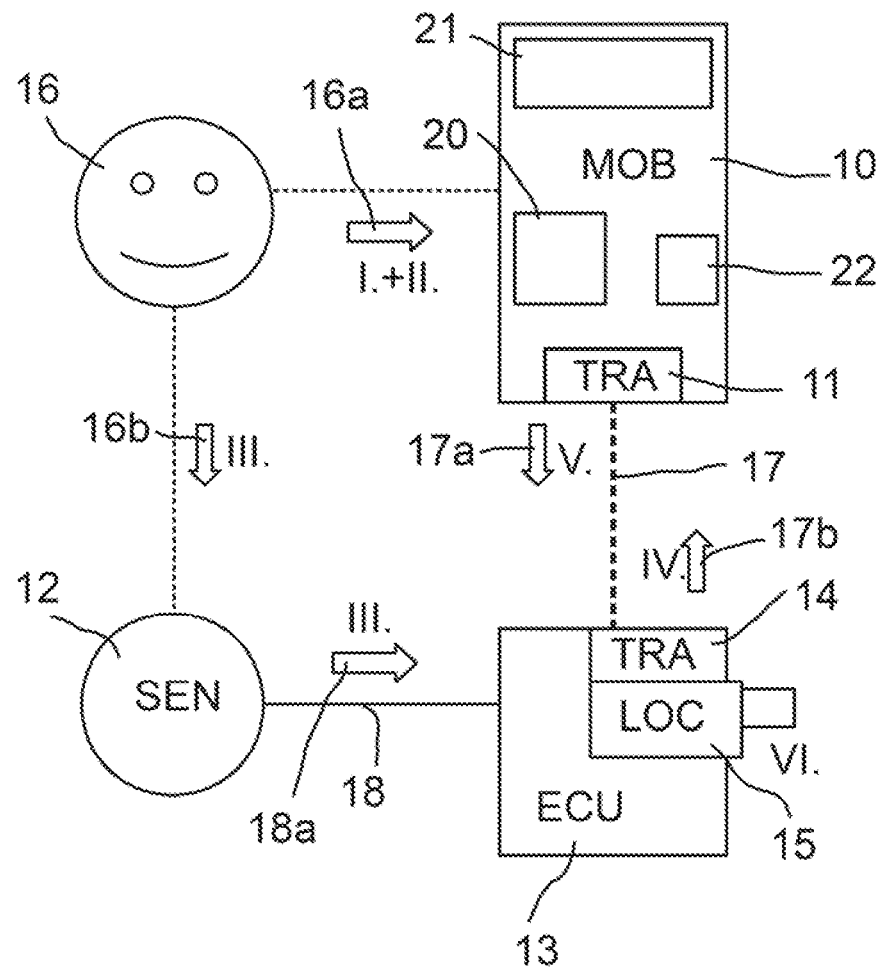
FIG. 1 is a schematic representation of a first embodiment of a method.
Figure 2:
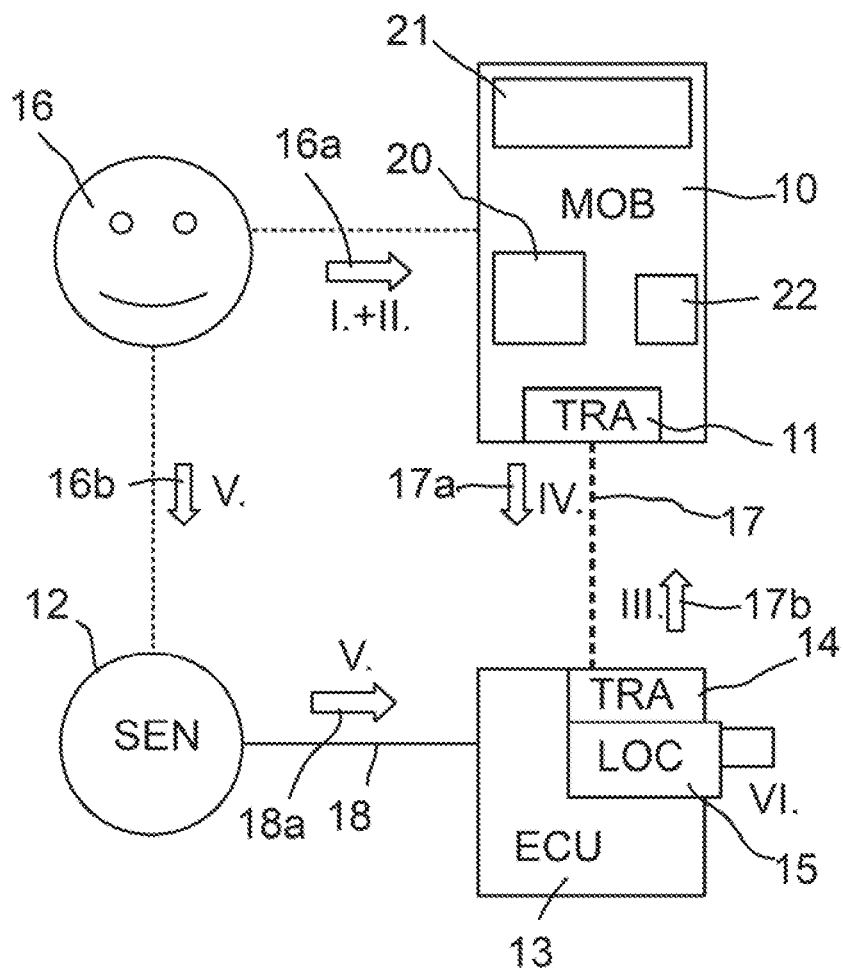
FIG. 2 is a schematic representation of a second embodiment of a method.
Figure 3:
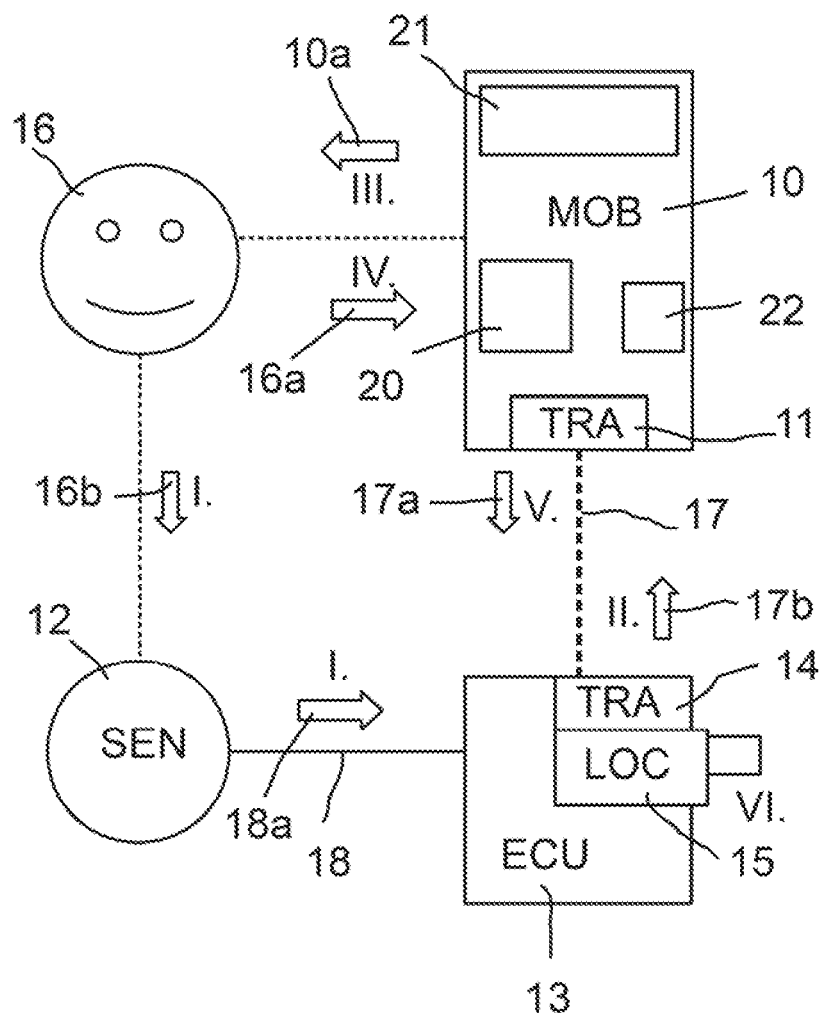
FIG. 3 is a schematic representation of a third embodiment of a method.

FIGS. 1 to 3 show three different variants of a system according to the disclosure, and a method according to the disclosure. System components respectively include a mobile device 10 with a transceiver 11, a sensor device 12, an electronic controller 13 with a transceiver 14, and a lock 15. The controller 13, the transceiver 14, the lock 15, and preferably also the sensor device 12 are installed in a vehicle not shown, in particular in a commercial vehicle.

In addition, a user 16 may engage with the system. The user 16 interacts with the mobile device 10 on the one hand and with the sensor device 12 on the other hand.

The mobile device 10 and controller 13 correspond via a wireless radio link 17, namely via the two transceivers 11, 14.

The sensor device 12 is connected to the electronic controller 13 via a line 18. Alternatively, a wireless connection may be provided.

In FIGS. 1 to 3, the electronic controller 13 is a component of the lock 15. Alternatively, the controller 13 and the lock 15 may be provided spatially separated and connected to one another by a line 19 (FIG. 4) or a wireless connection.

For better understanding, most of the system components in the figures are additionally provided with a three-letter abbreviation. However, only the reference characters are depicted below.

According to the embodiment in FIG. 1, the method is carried out via the following steps:

An access permission 17a for the lock 15, for example a numerical code, is stored in the mobile device 10. Basically, the mobile device may transmit the access permission 17a to the controller 13 upon request 17b of the controller 13. Required here as step I is a prior authorization 16a of the mobile device via an input of the user 16. To enable this, the mobile device 10 includes an input device 20, preferably a keypad. Preferably, an output device 21 can also be provided on the mobile device 10, for example a small screen, lights, and/or speakers.

After authorizing 16a the mobile device 10, the user 16 may, as step II, put away the device 10 or place it in a pocket or place it in the vehicle. If not already done, the user 16 ensures that the device 10 is close enough to the controller 13 to establish the intended radio link 17 between the transceiver 11 and the transceiver 14.

In a step III, the user performs an actuation 16b of the sensor device 12. The sensor device then transmits a signal 18a to the controller 13 via the line 18.

The controller 13 then prompts the mobile device 10 to transmit the access permission 17a; see step IV. The mobile device 10 receives the request 17b of the controller 13 and transmits the access permission 17a to the controller 13; see step V.

Finally, the controller 13 checks the received access permission 17a and unlocks or opens the lock 15; see step VI.

In the embodiment of FIG. 2, the procedure is as follows:

As in FIG. 1, the mobile device 10 is authorized by the user 16, see step I. Subsequently, the user may set aside or put away the device 10. This allows the user to have both hands free. If not already done, the user 16 ensures that the device 10 is close enough to the controller 13 to establish the intended radio link 17 between the transceiver 11 and the transceiver 14.

The controller 13 prompts the mobile device 10 to transmit the access permission 17a; see step III. Subsequently, the device 10 transmits the access permission 17a to the controller 13; see step IV.

Finally, the user 16 interacts with the controller 13 by actuating 16b the sensor device 12; see step V. Thereupon, the sensor device 12 transmits a corresponding signal 18a to the controller 13; still step V.

The controller 13 checks for the presence of the access permission 17a required for the lock 15 and the signal 18a of the sensor device 12, and opens or unlocks the lock 15 if everything is present or in order.

An additional check may be provided in the communication between the controller 13 and the mobile device 10. The controller 13 prompts the device 10 to transmit the access permission 17a specifically for the lock 15. The access permission 17a stored in the mobile device 10 includes a unique identification of the lock 15, so that the device 10 can compare the access permission requested by the controller 13 with the access permission 17a stored in the device 10. The device 10 transmits the access permission 17a only if there is a match. Preferably, this also applies to all other exemplary embodiments.

In the embodiment of FIG. 3, the procedure is as follows:

First, the user 16 actuates the sensor device 12; see step I. The sensor device 12 then transmits a corresponding signal 18a to the controller 13; also step I.

In step II, the controller 13 makes a request to the mobile device 10 to transmit the access permission 17a for the lock 15. Thereupon, the device 10, via its output device 21, notifies the user 16 via a prompt 10a that authorization 16a is required; see step III. The user responds to the prompt 10a by actuating the device 10 accordingly. Preferably, the device 10 is configured such that the user does not have to pick up the device 10 or type anything into a keypad or screen in order to actuate it. In particular, the device 10 includes an accelerometer 22 such that the user 16 need only shake or tap the device 10 in a specified pattern in order to actuate it. For this purpose, the device 10 may for example remain in a jacket pocket of the user 16; see step IV. The actuation is also the authorization 16a. The mobile device 10 then transmits the access permission 17a to the controller; see step V.

Figure 4:
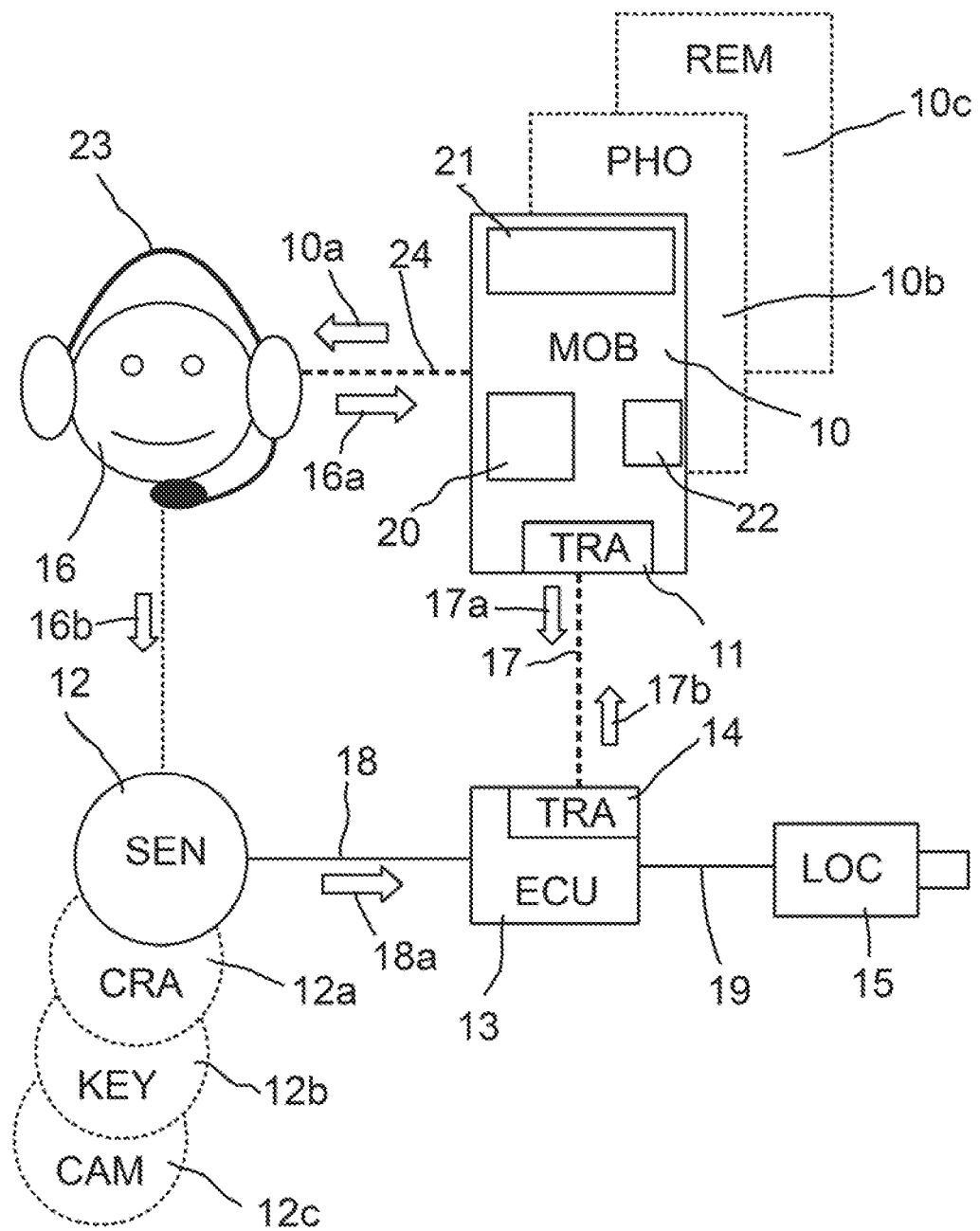
FIG. 4 is a depiction analogous to FIGS. 1 to 3, with modification of an interaction between the user and mobile device, and with optional system components.

As can be seen in FIG. 4, the user may wear a so-called headset 23 (headphones and microphone) that is coupled to the mobile device 10 via a radio link 24. In addition, the mobile device 10 is preferably equipped with speech recognition. Thus, in the embodiment of FIG. 3, the device 10 may issue the prompt 10a to the user 16 via the headset 23, and the user 16 may respond with a spoken command as an authorization 16a.

In an embodiment, another type of remote control is provided instead of the headset 23, so that the user 16 does not have to pick up the device 10.

The mobile device 10 is preferably a so-called smartphone 10b or a remote control 10c, analogous to known remote controls for audio/video devices, in each case preferably in connection with the possibility of outputting optical or acoustic signals. This applies to all exemplary embodiments.

The sensor device 12 is preferably a haptic, optical, or acoustic sensor, a handle 12a, a keypad 12b, and/or a camera 12c. This also applies to all exemplary embodiments.

Instead of the lock 15, another device in or on a vehicle may be coupled to the controller 13 via the line 19 or provided in a unit with the controller 13.

It is understood that the foregoing description is that of the preferred embodiments of the invention and that various changes and modifications may be made thereto without departing from the spirit and scope of the invention as defined in the appended claims.

LIST OF REFERENCE CHARACTERS (PART OF THE DESCRIPTION

10 Mobile device (MOB)
10a Prompt
10b Smartphone (PHO)
10c Remote control (REM)
11 Transceiver (TRA)
12 Sensor device (SEN)
12a Handle (CRA)
12b Keypad (KEY)
12c Camera (CAM)
13 Electric controller (ECU)
14 Transceiver (TRA)
15 Lock (LOC)
16 User
16a Authorization
16b Actuation
17 Radio link
17a Access permission
17b Request
18 Line
18a Signal
19 Line
20 Input device
21 Output device
22 Acceleration sensor
23 Headset
24 Radio link

What is claimed is:

1. A method for triggering a vehicle function via a wireless connection between a mobile device that is actuatable by a user and an electronic controller provided for triggering the vehicle function, wherein the controller is configured to check an access permission of the mobile device and to trigger the vehicle function only if the access permission is in order, the method comprising:
   a) prompting the mobile device via a request of the electronic controller to transmit the access permission to the electronic controller for the vehicle function;
   b) after said prompting the mobile device, receiving the request of the controller via the mobile device and transmitting, via the mobile device, the access permission to the electronic controller;
   c) after said receiving the request of the controller, checking the access permission via the controller and triggering the vehicle function via the controller if the access permission is in order;
   d) wherein the mobile device transmits the access permission to the controller only if the mobile device has previously been actuated for authorization and has thus been authorized to transmit the access permission; and,
   e) wherein the controller triggers the vehicle function only if a signal of a sensor device that is mounted in the vehicle and connected directly to the controller and that is actuatable by the user has previously been received in the controller to so provide a double level of security wherein the user must actuate both the mobile device and the sensor device at a time interval.

2. The method of claim 1, wherein the user actuates the sensor device for transmitting the signal to the controller:
   a) after authorization of the mobile device and before the controller prompts the mobile device to transmit the access permission; or,
   b) after transmitting the access permission from the mobile device to the controller; or,
   c) before the user actuates the mobile device for authorization and before the controller prompts the mobile device to transmit the access permission.

3. The method of claim 1, wherein the mobile device must be actuated for authorization of the transmission of the access permission, before the controller prompts the mobile device to transmit the access permission.

4. The method of claim 3, wherein the mobile device transmits the access permission only if a specified time period between the actuation of the mobile device for authorization and the request of the controller to transmit the access permission is not exceeded.

5. The method of claim 4, wherein the specified time period is permanently or temporarily stored in the mobile device.

6. The method of claim 1, wherein the mobile device must be actuated for authorization of the transmission of the access permission, after the controller has prompted the mobile device to transmit the access permission for the vehicle function, and before the mobile device transmits the access permission to the controller.

7. The method of claim 6, wherein the mobile device prompts the user for authorization via a signal perceptible by the user.

8. The method of claim 6, wherein the mobile device includes at least one of a keypad, a screen, and a touch-sensitive panel; and, the mobile device is actuated by the user via a sensor without reading or touching the at least one of the keypad, screen, and touch-sensitive panel.

9. The method of claim 1, wherein the mobile device includes an acceleration sensor and is configured to interpret a specified acceleration as an actuation.

10. The method of claim 1, wherein the mobile device is connected to an external input device wirelessly or in a wired manner; and, the user actuates the external input device for authorization.

11. The method of claim 1, wherein the sensor device includes one or several mechanical switches, tactile elements, or sensors.

12. The method of claim 1, wherein said mobile device is a cell phone or a remote control.

13. The method of claim 1, wherein the mobile device is a smartphone having an app, wherein the app is programmed for handling the access permission.

14. The method of claim 1, wherein the wireless connection is achieved via Bluetooth, Bluetooth Low Energy, WLAN, or NFC.

15. The method of claim 1, wherein the mobile device is radio network-capable and receives access permissions via a radio network.

16. The method of claim 1, wherein the vehicle function includes actuating a lock.

17. A system for triggering a vehicle function, the system comprising:
a mobile device configured to be actuatable by a user;
an electronic controller;
said mobile device and said electronic controller being configured to be connected via a wireless connection for triggering the vehicle function;
said electronic controller being configured to check an access permission of said mobile device and to trigger the vehicle function only if the access permission is in order;
said electronic controller being configured to prompt said mobile device via a request to transmit the access permission for the vehicle function,
said mobile device being configured to receive the request of said electronic controller and to transmit the access permission to said electronic controller;
said mobile device being further configured to transmit the access permission to said electronic controller if the mobile device has previously been actuated for authorization and has thus been authorized to transmit the access permission;
a sensor device mounted within the vehicle connected directly to said electronic controller and configured to be actuatable by the user and to transmit a signal to said electronic controller; and,
wherein said system provides a double level of security by requiring a user to actuate both said mobile device and said sensor device at a time interval.

18. The system of claim 17, wherein said mobile device is configured to require actuation by the user for transmitting the signal to said electronic controller:
a) after authorization of said mobile device and before said electronic controller prompts the mobile device to transmit the access permission; or,
b) after transmitting the access permission from said mobile device to said electronic controller; or,
c) before authorizing said mobile device and before said electronic controller prompts said mobile device to transmit the access permission.

19. The system of claim 17, wherein said mobile device is configured to require actuation for authorization of the transmission of the access permission before said sensor device transmits the signal to said electronic controller.

20. The system of claim 19, wherein said mobile device is configured to transmit the access permission only if a specified time period between the actuation of said mobile device for authorization and the request of said electronic controller to transmit the access permission has not been exceeded.

21. The system of claim 20, wherein the specified time period is stored in said mobile device permanently or temporarily.

22. The system of claim 17, wherein said mobile device is configured to require actuation for authorization of the transmission of the access permission, after said electronic controller has prompted said mobile device to transmit the access permission for the vehicle function, and before said mobile device transmits the access permission to said electronic controller.

23. The system of claim 17, wherein said mobile device is configured to output a signal that is perceptible by the user.

24. The system of claim 17, wherein said mobile device includes at least one of a keypad, a screen, and a touch-sensitive panel; and, said mobile device is configured to be actuated by the user via a sensor without reading or touching said at least one of said keypad, said screen, and said touch-sensitive panel.

25. The system of claim 17, wherein said mobile device includes an acceleration sensor configured to detect an acceleration and is configured to interpret the acceleration detected by said acceleration sensor as an actuation.

26. The system of claim 17, wherein said mobile device is connected to an external input device wirelessly or in a wired manner, and the input device is actuatable by the user.

27. The system of claim 17, wherein said sensor device includes one or several sensors, tactile elements, or mechanical switches for actuation by the user.

28. The system of claim 17, wherein said mobile device is a cell phone or a remote control.

29. The system of claim 17, wherein said mobile device is a smartphone having an app; and, said app is programmed for handling the access permission.

30. The system of claim 17, wherein said wireless connection between said electronic controller and said mobile device is configured to be implemented via Bluetooth, Bluetooth Low Energy, WLAN, or NFC.

31. The system of claim 17, wherein said mobile device is radio network-capable and is configured to receive access permissions via a radio network.

32. The system of claim 17 further comprising a vehicle lock connected to said electronic controller; and, the vehicle function to be triggered includes actuating said vehicle lock.

33. An electronic controller for carrying out the method of claim 1, the electronic controller comprising:
   a first interface configured to connect to the sensor device;
   a second interface for wireless connection to the mobile device; and,
   a third interface configured to trigger the vehicle function.

34. An electronic controller for implementation in the system of claim 17, the electronic controller comprising:
   a first interface configured to connect to the sensor device;
   a second interface for the wireless connection to the mobile device; and,
   a third interface configured to trigger the vehicle function.

* * * * *